US012133834B2

(12) United States Patent
Rihan

(10) Patent No.: US 12,133,834 B2
(45) Date of Patent: Nov. 5, 2024

(54) BOTTLE GRIP DEVICE

(71) Applicant: Rawan Rihan, Orland Park, IL (US)

(72) Inventor: Rawan Rihan, Orland Park, IL (US)

( * ) Notice: Subject to any disclaimer, the term of this patent is extended or adjusted under 35 U.S.C. 154(b) by 101 days.

(21) Appl. No.: 17/949,815

(22) Filed: Sep. 21, 2022

(65) Prior Publication Data

US 2024/0091106 A1 Mar. 21, 2024

(51) Int. Cl.

*A45F 3/16* (2006.01)
*A61J 9/06* (2006.01)
*B65D 23/10* (2006.01)

(52) U.S. Cl.

CPC ........... *A61J 9/0623* (2015.05); *A61J 9/0669* (2015.05); *B65D 23/104* (2013.01)

(58) Field of Classification Search

CPC ........ A45F 2005/008; A45F 2200/0583; A45F 3/16; A45F 2003/166; Y10S 224/901; Y10T 24/2708; A47G 23/0216
USPC ........................... 224/148.5, 148.6, 218, 901
See application file for complete search history.

(56) References Cited

U.S. PATENT DOCUMENTS 5,320,249 A * 6/1994 Strech ................ A47G 23/0216 220/771
5,862,927 A * 1/1999 Tebeau .................... A61J 9/006 248/104
6,588,074 B2 * 7/2003 Galkiewicz ........ A44B 18/0053 24/306
9,386,824 B1 * 7/2016 Schultz .............. A44B 18/0084
2006/0032032 A1 * 2/2006 Cheng ...................... H02G 3/32 24/306
2007/0170189 A1 * 7/2007 Carlile ...................... A45F 5/02 220/739
2008/0251553 A1 * 10/2008 Goldstone ................ A45F 3/14 224/258
2013/0098932 A1 4/2013 Hunt
2014/0217256 A1 * 8/2014 Young ....................... A45F 5/00 248/311.2
2016/0022067 A1 1/2016 Day
2017/0280862 A1 * 10/2017 Blackwood ............... A45F 3/00

* cited by examiner

*Primary Examiner* — Adam J Waggenspack
(74) *Attorney, Agent, or Firm* — Foley & Lardner LLP

(57) ABSTRACT

A bottle handling system including a bottle strap that wraps around a bottle and a hand strap that wraps around an arm or at least a portion of a hand. The bottle strap includes a first end, a second end, a first outer surface, and a first inner surface that engages the bottle when the bottle strap is wrapped around the bottle. The first inner surface overlaps the first outer surface to form a first loop that engages the bottle. The hand strap includes a third end, a fourth end, a second outer surface, and a second inner surface that engages the arm or at least the portion of the hand. The bottle strap and the hand strap are coupled together at an interface. The second inner surface overlaps the second outer surface to form a second loop that engages the arm or at least the portion of the hand.

20 Claims, 2 Drawing Sheets

BOTTLE GRIP DEVICE

BACKGROUND

A typical bottle includes a body that allows a user to handle (e.g., hold, move, etc.) the bottle by wrapping a portion of a hand of the user around the body of the bottle. The body may include a tapered shape, one or more indentations, or one or more grooves designed to receive the portion of the hand, allowing for an improved connection between the bottle and the portion of the hand.

SUMMARY

One embodiment relates to a bottle handling system having a bottle strap that selectively wraps around a bottle. The bottle strap includes a first end, an opposing second end, a first outer surface, and a first inner surface that engages the bottle when the bottle strap is wrapped around the bottle. At least a first portion of the first inner surface proximate the first end overlaps at least a second portion of the first outer surface positioned proximate the opposing second end to couple the first end and the opposing second end together to form a first loop that engages with the bottle. The bottle handling system further includes a hand strap that selectively wraps around an arm or at least a portion of a hand. The hand strap includes a third end and an opposing fourth end. The hand strap further includes a second outer surface and a second inner surface that engages the arm or at least the portion of the hand when the hand strap is wrapped around the arm or at least the portion of the hand. At least a third portion of the second inner surface proximate the third end overlaps at least a fourth portion of the second outer surface positioned proximate the opposing fourth end to couple the third end and the opposing fourth end together to form a second loop that fits around the arm or at least the portion of the hand. The bottle strap and the hand strap are coupled together at an interface.

Another embodiment relates to a bottle handling system having a bottle strap that selectively wraps around a bottle. The bottle strap includes a first end, an opposing second end, a first outer surface, and a first inner surface that engages the bottle when the bottle strap is wrapped around the bottle. At least a first portion of the first inner surface proximate the first end overlaps at least a second portion of the first outer surface positioned proximate the opposing second end to couple the first end and the opposing second end together to form a first loop that engages with the bottle. The bottle handling system further includes a hand strap that selectively wraps around an arm or at least a portion of a hand. The hand strap includes a third end and an opposing fourth end having an aperture. The third end selectively extends through the aperture to form a second loop that fits around the arm or at least the portion of the hand. The hand strap further includes a second outer surface and a second inner surface that engages the arm or at least the portion of the hand when the hand strap is wrapped around the arm or at least the portion of the hand. At least a third portion of the second inner surface proximate the third end overlaps at least a fourth portion of the second outer surface positioned proximate the opposing fourth end to couple the third end and the opposing fourth end together to form the second loop. The bottle strap and the hand strap are coupled together at an interface via an adhesive and a sewn thread. The bottle strap has a first length and the hand strap has a second length, the first length is about 50% longer than the second length. The bottle strap and the hand strap are manufactured from either nylon or polyester.

Yet another embodiment relates to a bottle handling system including a first strap and a second strap. The first strap selectively wraps around a bottle. The first strap includes a first end, an opposing second end, a first outer surface, and a first inner surface. The first inner surface engages the bottle when the first strap is wrapped around the bottle. The first end and the opposing second end at least partially overlap to selectively form a first loop that engages with the bottle. The second strap selectively wraps around an arm or at least a portion of a hand. The second strap includes a third end, an opposing fourth end, a second outer surface, and a second inner surface. The second inner surface engages the arm or at least the portion of the hand when the second strap is wrapped around the arm or at least the portion of the hand. The third end and the opposing fourth end at least partially overlap to selectively form a second loop that engages with the arm or at least the portion of the hand. The first strap and the second strap are coupled together at an interface. The first inner surface and the first outer surface provide or include a first hook and loop fastener that facilitates coupling the first inner surface and the first outer surface together to form the first loop. The second inner surface and the second outer surface provide or include a second hook and loop fastener that facilitates coupling the second inner surface and the second outer surface together to form the second loop.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a handling system of the present disclosure includes a first strap that selectively wraps around a container (e.g., a bottle, a can, a beverage container, etc.) and a second strap that selectively wraps around an arm or at least a portion of a hand of a user. The handling system facilitates selectively securing the container to the arm or at least the portion of the hand. When used by young children (e.g., babies, infants, toddlers, etc.), the handling system encourages fine motor skills development for the young children and aids with muscle control while drinking from the container. The handling system can prevent droppage, spillage, or loss of the container and prevents or minimizes unsafe habits of handling, such as holding the container on a chest of a young child or contaminating the container from falling to the ground. Furthermore, the handling system provides the young children with control of the container, allowing the young children to move the container away from their mouths in order to stop drinking. While this helps reduce over-feeding of the young children, it also helps minimize or prevent tooth decay caused by maintaining a portion of the container (e.g., a nipple of a bottle, etc.) inside of the mouths of the young children over a long period of time (e.g., during sleep, etc.).

Figure 1:
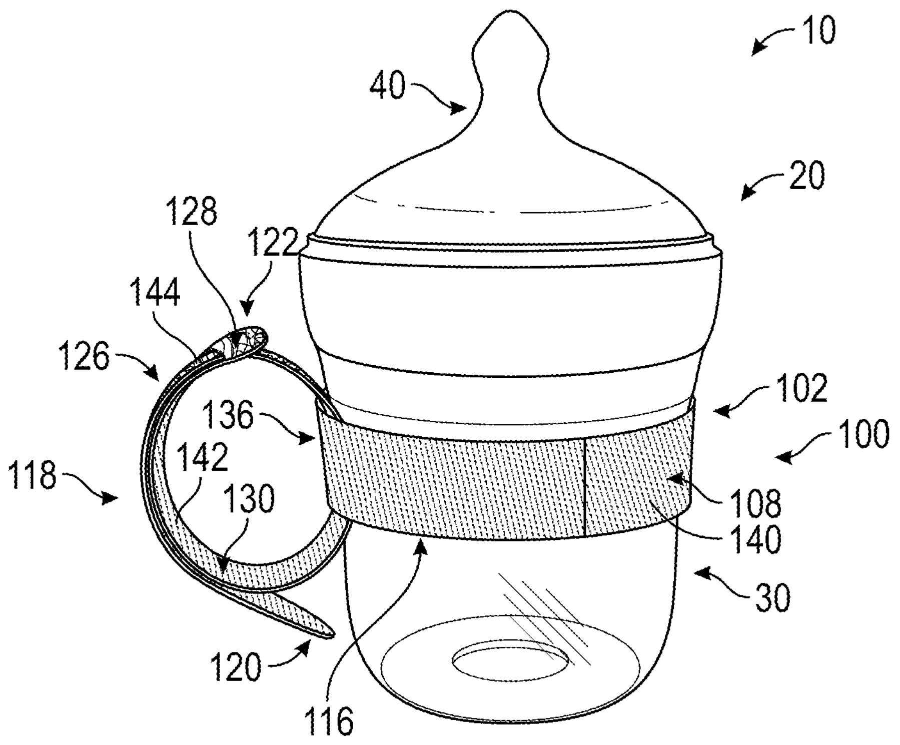
FIG. 1 is a perspective view of a container including a handling system, according to an exemplary embodiment.

As shown in FIG. 1, a bottle system 10 includes a container (e.g., a liquid container, a beverage container, a can, a bottle, a baby bottle, a "sippy" cup, etc.), shown as bottle 20. According to the example embodiment shown in FIG. 1, the bottle 20 is configured as a baby bottle (e.g., a reusable bottle having a nipple portion and configured to contain milk, etc.). In other embodiments, the bottle 20 is configured as a water bottle (e.g., an 8 oz-32 oz bottle filled with water from a water distributer, a plastic water bottle, a single-use water bottle, etc.), a reusable bottle (e.g., an insulated bottle, a metal bottle, a reusable plastic bottle, etc.), or a beverage bottle (e.g., a soda can, a milk bottle, a juice bottle, etc.). As shown in FIG. 1, the bottle 20 includes an outer shell, shown as body 30, and a top portion (e.g., a cap, a neck portion, a nipple portion, etc.), shown as drinking portion 40.

Figure 2:
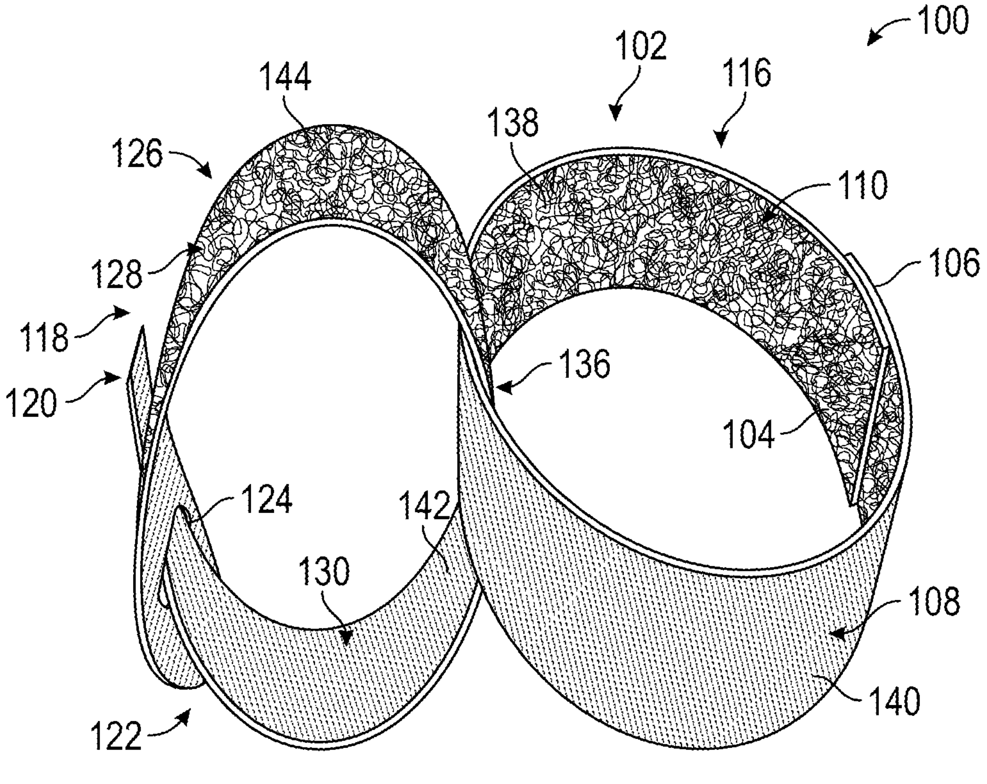
FIG. 2 is a perspective view of the handling system of FIG. 1 in a first configuration, according to an exemplary embodiment.
Figure 3:
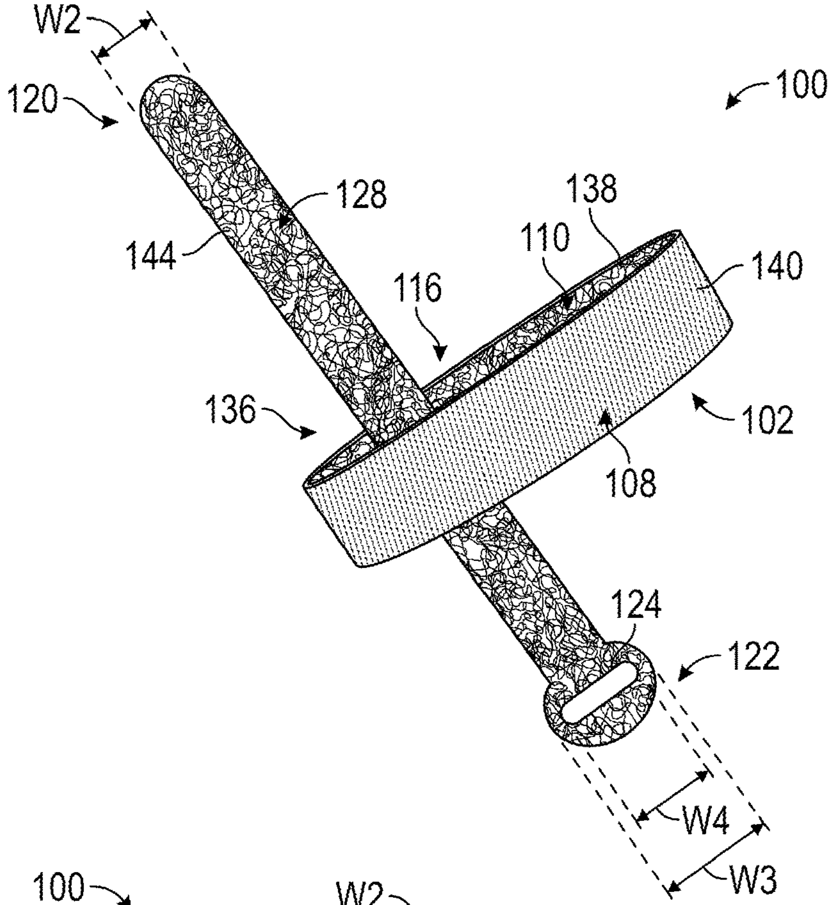
FIG. 3 is another perspective view of the handling system of FIG. 2 in a second configuration, according to an exemplary embodiment.
Figure 4:
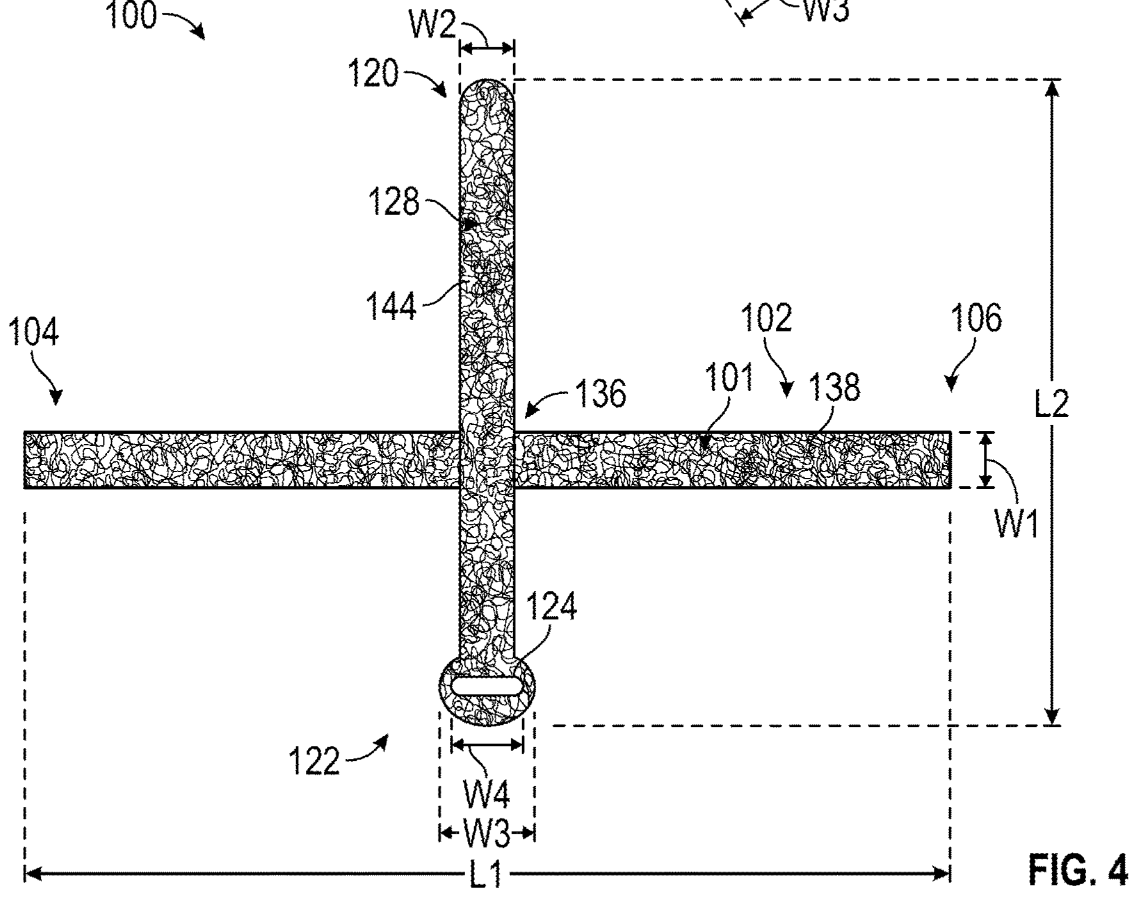
FIG. 4 is a top view of the handling system of FIG. 2 in a third configuration, according to an exemplary embodiment.

As shown in FIGS. 1-4, the bottle system 10 further includes a handling system, shown as bottle handling system 100, configured to provide a coupling mechanism between the bottle 20 and a user (e.g., an adult, a child, a young child, a baby, etc.). The bottle handling system 100 includes a first strap or band, shown as bottle strap 102, configured to selectively wrap around the body 30 of the bottle 20. As shown in FIGS. 2 and 4, the bottle strap 102 has a first end, shown as end 104, and an opposing second end, shown as end 106. As shown in FIGS. 1-4, the bottle strap 102 has a first outer surface, shown as outer surface 108, and a first inner surface, shown as inner surface 110. As shown in FIG. 1, the inner surface 110 of the bottle strap 102 is configured to engage the body 30 when the bottle strap 102 is wrapped around the body 30 of the bottle 20. In some embodiments, at least a portion of the inner surface 110 is or includes a material or coating (e.g., rubber, rubber dimples, a high friction material, etc.) to increase grip or friction with the body 30.

As shown in FIG. 2, at least a first portion of the inner surface 110 of the bottle strap 102 positioned proximate the end 106 of the bottle strap 102 is configured to overlap at least a second portion of the outer surface 108 of the bottle strap 102 positioned proximate the end 104 of the bottle strap 102 to selectively couple the end 104 and the end 106 together to form a first loop, shown as bottle loop 116, that engages with (e.g., fits around, wraps around, etc.) the body 30 of the bottle 20. In other embodiments, at least a first portion of the inner surface 110 of the bottle strap 102 positioned proximate the end 104 of the bottle strap 102 is configured to overlap at least a second portion of the outer surface 108 of the bottle strap 102 positioned proximate the end 106 of the bottle strap 102 to selectively couple the end 104 and the end 106 together to form the bottle loop 116. According to an exemplary embodiment, a diameter of the bottle loop 116 is adjustable. The bottle strap 102, therefore, can be secured to the body 30 of various different diameter bottles 20 (i.e., so long as the diameter of the bottle loop 116 is equal to or greater than the diameter of the body 30). In some embodiments, the end 106 of the bottle strap 102 defines an aperture (e.g., an opening, a hole, a slot, etc.) configured to receive the end 104 such that the end 104 selectively extends through the aperture to form the bottle loop 116 that engages with the body 30 of the bottle 20. In some embodiments, the end 104 of the bottle strap 102 defines the aperture configured to receive the end 106. In some embodiments, the bottle strap 102 includes an adjustable strap buckle (e.g., a cam buckle, a slide bar buckle, a slip-lock buckle, a watch buckle, etc.) coupled to one of the end 104 or the end 106 that selectively receives the other one of the end 104 or the end 106 to form the bottle loop 116.

As shown in FIGS. 1-4, the bottle handling system 100 includes a second strap or band, shown as hand strap 118, configured to selectively wrap around an arm or at least a portion of a hand of the user. The hand strap 118 has a third end, shown as end 120, and an opposing fourth end, shown as end 122. The end 120 and the end 122 are engageable to secure the hand strap 118 about an arm or hand of a user, such as by removable securing the end 120 and the end 122 together. In one embodiment, the end 122 of the hand strap 118 defines an opening, hole, or slot, shown as aperture 124, configured to selectively receive the end 120. Accordingly, in some embodiments, the hand strap 118 and the bottle strap 102 have different structures. In some embodiments, however, the structures of the hand strap 118 and the bottle strap 102 are the same. In some embodiments, the end 120 of the hand strap 118 defines the aperture 124. As shown in FIGS. 1 and 2, the end 120 of the hand strap 118 is configured to selectively extend through the aperture 124 of the end 122 of the hand strap 118 to form a second loop, shown as hand loop 126. According to an exemplary embodiment, the hand loop 126 is configured to fit around (e.g., wraps around, engages with, etc.) the arm or at least the portion of the hand of the user. In other embodiments, hand strap 118 does not define the aperture 124. In some embodiments, the hand strap 118 includes an adjustable strap buckle (e.g., a cam buckle, a slide bar buckle, a slip-lock buckle, a watch buckle, etc.) coupled to one of the end 120 or the end 122 that selectively receives the other one of the end 120 or the end 122 to form the hand loop 126.

As shown in FIGS. 1-4, the hand strap 118 has a second outer surface, outer surface 128, and a second inner surface, inner surface 130. The inner surface 130 is configured to engage with the arm or at least the portion of the hand when the hand strap 118 is wrapped around the arm of at least the portion of the hand. As shown in FIGS. 1 and 2, at least a third portion of the inner surface 130 of the hand strap 118 positioned proximate the end 120 of the hand strap 118 is configured to overlap at least a fourth portion of the outer surface 128 of the hand strap 118 positioned proximate the end 122 of the hand strap 118 (e.g., when the end 120 is pulled through the aperture 124) to selectively couple the end 120 and the end 122 together to form the hand loop 126. In other embodiments, at least a third portion of the outer surface 128 of the hand strap 118 positioned proximate the end 120 of the hand strap 118 is configured to be overlapped by at least a fourth portion of the inner surface 130 of the hand strap 118 positioned proximate the end 122 of the hand strap 118 (e.g., when the end 120 is pulled through the aperture 124) to selectively couple the end 120 and the end 122 together to form the hand loop 126. According to an exemplary embodiment, a diameter of the hand loop 126 is adjustable. The hand strap 118, therefore, can be secured different sized or diameter arms or hands of various users (i.e., so long as the diameter of the hand loop 126 is equal to or greater than the size or diameter of the arm or hand).

In some embodiments, at least the portion of the hand may be one or more fingers (e.g., four fingers excluding a thumb, etc.). In other embodiments, at least the portion of the hand may be one or more knuckles, a back of the hand, or a wrist. In yet other embodiments, at least the portion of the hand may be a combination of any of (i) one or more fingers, (ii) one or more knuckles, (iii) the back of the hand, or (iv) the wrist.

As shown in FIGS. 1-4, the bottle handling system 100 includes an interface or connection portion, shown as connection interface 136, disposed between the bottle strap 102 and the hand strap 118. The connection interface 136 is configured to facilitate coupling the bottle strap 102 and the hand strap 118 together. By way of example, the connection interface 136 may include (i) a first interface or coupler disposed proximate a center of the inner surface 110 of the bottle strap 102 and (ii) a second interface disposed proximate a center of the inner surface 130 of the hand strap 118. The first interface is configured to couple to the second interface when the bottle strap 102 and the hand strap 118 are coupled together at the connection interface 136. As shown in FIG. 4, the bottle strap 102 and the hand strap 118 are coupled at the connection interface 136 such that a longitudinal axis of the bottle strap 102 is perpendicular to a longitudinal axis of the hand strap 118. In some embodiments, the bottle strap 102 and the hand strap 118 are coupled together at the connection interface 136 via a sewn thread. In some embodiments, the bottle strap 102 and the hand strap 118 are coupled together at the connection interface 136 via an adhesive (e.g., glue, etc.). In such embodiments, the adhesive may be non-toxic and/or biodegradable. In some embodiments, the bottle strap 102 and the hand strap 118 are coupled together at the connection interface 136 via both a sewn thread and an adhesive. In some embodiments, the connection interface 136 includes additional or different types of couplers (e.g., snaps, buttons, etc.). According to an exemplary embodiment, the connection interface 136 (e.g., including both the sewn thread and the adhesive) is configured to facilitate supporting up to at least thirty pounds with the bottle strap 102 when the hand strap 118 is wrapped around the arm or at least the portion of the hand.

According to an exemplary embodiment, the outer surface 108 and the inner surface 110 of the bottle strap 102 include or provide a first hook and loop fastener that facilitates coupling the inner surface 110 and the outer surface 108 together to form the bottle loop 116. As shown in FIGS. 1-4, the inner surface 110 include a plurality of loops 138 and the outer surface 108 includes a plurality of hooks 140, where at least some of the plurality of hooks 140 couple to at least some of the plurality of loops 138 when the inner surface 110 and the outer surface 108 engage. In other embodiments, the plurality of loops 138 are on the outer surface 108 and the plurality of hooks 140 are on the inner surface 110. The first hook and loop fastener may extend the entire length of the bottle strap 102, or may include a plurality of discrete, spaced apart hook and loop fasteners. In some embodiments, the material of the bottle strap 102 provides a natural hook and loop fastening feature such that a respective hook and look fastener does not need to be attached (e.g., sewn, glued, etc.) thereto. In some embodiments, the bottle strap 102 additionally or alternatively includes another type of coupler or closure mechanism as described above (e.g., an adjustable strap buckle, etc.).

According to an exemplary embodiment, the outer surface 128 and the inner surface 130 of the hand strap 118 include or provide a second hook and loop fastener that facilitates coupling the inner surface 130 and the outer surface 128 together to form the hand loop 126. As shown in FIGS. 1-4, the inner surface 130 includes a plurality of hooks 142 and the outer surface 128 includes a plurality of loops 144, where at least some of the plurality of loops 144 couple to at least some of the plurality of hooks 142 when the inner surface 130 and the outer surface 128 engage. In other embodiments, the plurality of hooks 142 are on the outer surface 128 and the plurality of loops 144 are on the inner surface 130. The second hook and loop fastener may extend the entire length of the hand strap 118, or may include a plurality of discrete, spaced apart hook and loop fasteners. In some embodiments, the material of the hand strap 118 provides a natural hook and loop fastening feature such that a respective hook and look fastener does not need to be attached (e.g., sewn, glued, etc.) thereto. In some embodiments, the hand strap 118 additionally or alternatively includes another type of coupler or closure mechanism as described above (e.g., an adjustable strap buckle, etc.).

As shown in FIG. 4, the bottle strap 102 has a first length, shown as length L1, extending from the end 104 to the end 106 and the hand strap 118 has a second length, shown as length L2, extending from the end 120 to the end 122. In some embodiments, the length L1 is equal or substantially equal to the length L2. In some embodiments, the length L1 is different than (e.g., not equal to, not substantially equal to, etc.) the length L2. In such embodiments, the length L1 may be greater than the length L2. By way of example, the length L1 may be about 50% longer than the length L2 (e.g., 45% to 55%). By way of another example, the length L1 may between 25% and 50% longer than the length L2. In various embodiments, the length L1 is between about 10 inches ("in") and about 14 in (e.g., 10, 11, 12, 13, 14, etc. in). In one embodiment, the length L1 is about 12 in (e.g., between 11.5 in and 12.5 in). In various embodiments, the length L2 is between about 6 in and about 10 in (e.g., 6, 7, 8, 9, 10, etc. in). In one embodiment, the length L2 is about 8 in (e.g., between 7.5 in and 8.5 in).

As shown in FIG. 4, the bottle strap 102 has a first width, shown as width W1. In some embodiments, the width W1 is between about 0.5 in and about 3 in. In one embodiment, the width W1 is about 1 in. As shown in FIGS. 3 and 4, the hand strap 118 has a second width, shown as width W2, proximate the end 120. In some embodiments, the width W2 is between about 0.5 in and about 3 in. In one embodiment, the width W2 may be about 1 in. In some embodiments, the width W1 is equal or substantially equal to the width W2. In other embodiments, the width W1 is different than (e.g., not equal to, not substantially equal to, etc.) the width W2. In such embodiments, the width W1 may be greater than the width W2, such that the width W1 may be about 50% wider than the width W2. Alternatively, in such embodiments, the width W1 may be less wide than the width W2, such that the width W1 may be about 50% less than the width W2.

As shown in FIGS. 3 and 4, the hand strap 118 has a third width, shown as width W3, proximate the end 122 that is wider than the width W2. In some embodiments, the width W2 is between about 0.5 in and about 3 in. In one embodiment, the width W2 is about 1.5 to 2 in. As shown in FIGS. 3 and 4, the aperture 124 has a fourth width, shown as width W4. The width W4 is configured to be less wide than the width W3 and longer than the width W2. In some embodiments, the width W2 is between about 0.5 in and about 3 in. In one embodiment, the width W2 is about 1 to 1.5 in.

According to an exemplary embodiment, the bottle strap 102 has a first color and the hand strap 118 has a second color. In some embodiments, the first color is same as the second color. In such embodiments, the first color may be a darker/lighter shade than the second color, or the first color may be glossier/duller than the second color. In other embodiments, the first color is different than the second color. By way of example, the first color may be white and the second color may be a non-white color (e.g., blue, pink, green, etc.). It should be appreciated that the colors disclosed above are non-limiting and that the first color and the second color may be any color (e.g., primary colors: red, blue, or yellow, or a mix of primary colors: (i) red and blue, (ii) red and yellow, (iii) blue and yellow, or (iv) red, blue and yellow).

In some embodiments, the bottle strap 102 has a first pattern and the hand strap 118 has a second, different pattern. In some embodiments, the first pattern has the same color as the second pattern. In some embodiments, the first pattern has a different color than the second pattern. By way of example, the first pattern and the second pattern may different ones of a solid color, a stripped pattern, a checkered pattern, a camouflage pattern, or still another pattern. According to an exemplary embodiment, manufacturing the bottle strap 102 and the handle strap 118 from materials having different colors and/or patterns can facilitate easily distinguishing which of the straps is meant to be attached to the bottle 20 and which of the straps is meant to be attached to the hand/arm of the user.

The bottle strap 102 and the hand strap 118 may be manufactured from (e.g., made of, etc.) synthetic polymers (e.g., nylon, polyethylene, polyester, etc.). In some embodiments, (i) the bottle strap 102 is manufactured from nylon and the hand strap 118 is manufactured from polyester, (ii) the bottle strap 102 is manufactured from polyester and the hand strap 118 is manufactured from nylon, (iii) the bottle strap 102 and the hand strap 118 are manufactured from nylon, or (iv) the bottle strap 102 and the hand strap 118 are manufactured from polyester. Such materials may provide a delicate feel and not irritate the sensitive skin of young children. It should be appreciated that the materials disclosed in the embodiments above are non-limiting and that the bottle strap 102 and the hand strap 118 may be made of any suitable fabrics or materials.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, are understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the bottle system 10 and components thereof (e.g., the bottle 20, the bottle handling system 100, etc.) as shown in the various exemplary embodiments is illustrative only. Additionally, any element disclosed in one embodiment may be incorporated or utilized with any other embodiment disclosed herein.

The invention claimed is:

1. A bottle handling system comprising:
- a bottle strap configured to selectively wrap around a bottle, the bottle strap comprising:
  - a first end;
  - an opposing second end;
  - a first outer surface;
  - a first inner surface configured to engage the bottle when the bottle strap is wrapped around the bottle, wherein at least a first portion of the first inner surface proximate the first end is configured to overlap at least a second portion of the first outer surface positioned proximate the opposing second end to couple the first end and the opposing second end together to form a first loop that engages with the bottle; and
  - a first interface disposed on the first inner surface; and
- a hand strap configured to selectively wrap around an arm or at least a portion of a hand, the hand strap comprising:
  - a third end;
  - an opposing fourth end;
  - a second outer surface;

a second inner surface configured to engage the arm or at least the portion of the hand when the hand strap is wrapped around the arm or at least the portion of the hand, wherein at least a third portion of the second inner surface proximate the third end overlaps at least a fourth portion of the second outer surface positioned proximate the opposing fourth end to couple the third end and the opposing fourth end together to form a second loop that fits around the arm or at least the portion of the hand; and a second interface disposed on the second inner surface, the second interface coupled to the first interface such that the bottle strap and the hand strap are coupled together;

wherein the third end extends past a first edge of the bottle strap and the opposing fourth end extends past an opposing second edge of the bottle strap such that the opposing fourth end at least partially overlaps with the third end to form the second loop around the bottle strap.

2. The bottle handling system of claim 1, wherein the opposing fourth end defines an aperture, and wherein the third end is configured to selectively extend through the aperture to form the second loop.

3. The bottle handling system of claim 1, wherein the bottle strap and the hand strap are coupled together at the first interface and the second interface via at least one of a sewn thread or an adhesive.

4. The bottle handling system of claim 1, wherein:

the first interface is proximate a center of the bottle strap along a longitudinal length thereof; and the second interface is proximate a center of the hand strap along a longitudinal length thereof.

5. The bottle handling system of claim 3, wherein:

the bottle strap and the hand strap are coupled together at the first interface and the second interface via the sewn thread and the adhesive; and the adhesive is a non-toxic glue.

6. The bottle handling system of claim 5, wherein the sewn thread and the adhesive facilitate supporting up to at least thirty pounds with the bottle strap when the hand strap is wrapped around the arm or at least the portion of the hand.

7. The bottle handling system of claim 1, wherein the bottle strap has a first length and the hand strap has a second length that is different than the first length.

8. The bottle handling system of claim 7, wherein the first length is greater than the second length.

9. The bottle handling system of claim 8, wherein the first length is about 50% longer than the second length.

10. The bottle handling system of claim 8, wherein the first length is between 10 inches and 14 inches, and wherein the second length is between 6 inches and 10 inches.

11. The bottle handling system of claim 8, wherein the first length is about 12 inches, and wherein the second length is about 8 inches.

12. The bottle handling system of claim 1, wherein the bottle strap has a first color or pattern and the hand strap has a second color or pattern that is different than the first color or pattern.

13. The bottle handling system of claim 1, wherein the hand strap is manufactured from at least one of nylon or polyester.

14. The bottle handling system of claim 1, wherein the bottle strap and the hand strap are manufactured from the same material.

15. The bottle handling system of claim 1, wherein the bottle strap and the hand strap are manufactured from different materials.

16. The bottle handling system of claim 1, wherein the first inner surface and the first outer surface provide or include a first hook and loop fastener that facilitates coupling the first inner surface and the first outer surface together to form the first loop, and wherein the second inner surface and the second outer surface provide or include a second hook and loop fastener that facilitates coupling the second inner surface and the second outer surface together to form the second loop.

17. A bottle handling system comprising:

a bottle strap configured to selectively wrap around a bottle, the bottle strap comprising:

a first end;

an opposing second end;

a first outer surface;

a first inner surface configured to engage the bottle when the bottle strap is wrapped around the bottle, wherein at least a first portion of the first inner surface proximate the first end is configured to overlap at least a second portion of the first outer surface positioned proximate the opposing second end to couple the first end and the opposing second end together to form a first loop that engages with the bottle; and a first interface disposed on the first inner surface, the first interface being proximate a center of the bottle strap along a longitudinal length thereof; and a hand strap configured to selectively wrap around an arm or at least a portion of a hand, the hand strap comprising:

a third end;

an opposing fourth end defining an aperture, wherein the third end is configured to selectively extend through the aperture to form a second loop that fits around the arm or at least the portion of the hand;

a second outer surface;

a second inner surface configured to engage the arm or at least the portion of the hand when the hand strap is wrapped around the arm or at least the portion of the hand, wherein at least a third portion of the second inner surface proximate the third end overlaps at least a fourth portion of the second outer surface positioned proximate the opposing fourth end to couple the third end and the opposing fourth end together to form the second loop; and a second interface disposed on the second inner surface, the second interface being proximate a center of the hand strap along a longitudinal length thereof, the second interface coupled to the first interface such that the bottle strap and the hand strap are coupled together;

wherein the third end extends past a first edge of the bottle strap and the opposing fourth end extends past an opposing second edge of the bottle strap such that the opposing fourth end at least partially overlaps with the third end to form the second loop around the bottle strap;

wherein the bottle strap and the hand strap are coupled together at the first interface and the second interface via an adhesive and a sewn thread;

wherein the bottle strap has a first length and the hand strap has a second length, the first length being about 50% longer than the second length; and wherein the bottle strap and the hand strap are manufactured from nylon or polyester.

18. The bottle handling system of claim 17, wherein the bottle strap has a first color and the hand strap has a second color that is different than the first color.

19. A bottle handling system comprising:

a first strap configured to selectively wrap around a bottle, the first strap comprising:

a first end;

an opposing second end;

a first outer surface;

a first inner surface configured to engage the bottle when the first strap is wrapped around the bottle, wherein the first end and the opposing second end are configured to at least partially overlap to selectively form a first loop that engages with the bottle; and a first interface disposed on the first inner surface, the first interface being proximate a center of the first strap along a longitudinal length thereof; and a second strap configured to selectively wrap around an arm or at least a portion of a hand, the second strap comprising:

a third end;

an opposing fourth end;

a second outer surface;

a second inner surface configured to engage the arm or at least the portion of the hand when the second strap is wrapped around the arm or at least the portion of the hand, wherein the third end and the opposing fourth end at least partially overlap to form a second loop that engages with the arm or at least the portion of the hand; and a second interface disposed on the second inner surface, the second interface being proximate a center of the second strap along a longitudinal length thereof, the second interface coupled to the first interface such that the first strap and the second strap are coupled together;

wherein the third end extends past a first edge of the first strap and the opposing fourth end extends past an opposing second edge such that the opposing fourth end at least partially overlaps with the third end to form the second loop around the first strap;

wherein the first inner surface and the first outer surface provide or include a first hook and loop fastener that facilitates coupling the first inner surface and the first outer surface together to form the first loop; and wherein the second inner surface and the second outer surface provide or include a second hook and loop fastener that facilitates coupling the second inner surface and the second outer surface together to form the second loop.

20. The bottle handling system of claim 19, wherein:

the first strap and the second strap have a different structure;

the first strap and the second strap are coupled together at the first interface and the second interface via a sewn thread;

the first strap has a first color or pattern and the second strap has a second color or pattern that is different than the first color or pattern;

the first strap has a first length and the second strap has a second length, the first length being about 50% longer than the second length; and at least one of the first strap or the second strap is manufactured from at least one of nylon or polyester.

* * * * *